United States Patent [19]

Haukaas

[11] Patent Number: 5,027,525
[45] Date of Patent: Jul. 2, 1991

[54] FIELD MARKER

[76] Inventor: Duane Haukaas, Box 8, Mortlach, Saskatchewan, Canada, S0H 3E0

[21] Appl. No.: 415,167
[22] Filed: Oct. 2, 1989
[51] Int. Cl.[5] .................. A01B 69/02; G01B 3/00
[52] U.S. Cl. .................................. 33/624; 172/126; 172/132; 33/264
[58] Field of Search ............ 33/624, 264, 263; 172/126, 430, 128, 132

[56] References Cited

U.S. PATENT DOCUMENTS

| 497,339 | 5/1893 | Peters | 33/624 |
|---|---|---|---|
| 1,021,021 | 3/1912 | Vibbert | 33/624 |
| 2,483,011 | 9/1949 | Hudson | 33/624 |
| 3,028,678 | 4/1962 | Bakehouse | 33/624 |
| 3,503,451 | 3/1970 | Eastman | 172/132 |
| 3,747,148 | 7/1973 | Hitchcock | 172/126 |
| 3,762,482 | 10/1973 | Johnson | 172/132 |
| 3,766,987 | 10/1973 | Orthman | 172/126 |
| 4,049,062 | 9/1977 | Rossmiller et al. | 172/126 |
| 4,203,226 | 5/1980 | Hasquenoph | 33/624 |
| 4,526,235 | 7/1985 | Kinzenbaw | 172/126 |
| 4,530,405 | 7/1985 | White | 172/126 |
| 4,674,578 | 6/1987 | Bexten et al. | 172/126 |
| 4,880,160 | 11/1989 | Patterson et al. | 172/126 |

Primary Examiner—William A. Cuchlinski, Jr.
Assistant Examiner—C. W. Fulton
Attorney, Agent, or Firm—Adrian D. Battison; Stanley G. Ade; Murray E. Thrift

[57] ABSTRACT

An improved field marker is provided which can be used on an agricultural implement of the type which includes wing folding. The field marker has an arm with a disk mounted on an outer end of the arm and a mounting system at the inner end of the arm for supporting the arm on the implement. The arm includes two portions which fold in a knee type action while the inner portion is folded through 90° so that both portions lie along the side of the implement. The mounting assembly includes a fixed portion attached to the implement and a pivotal portion which moves about a horizontal axis. A spring biases the arm towards a raised position. In the extended position of the arm the spring force is overcome and the disk rests on the ground. As the arm retracts to the folded position and the effective weight decreases the spring forces lift the arm.

19 Claims, 4 Drawing Sheets

FIELD MARKER

BACKGROUND OF THE INVENTION

This invention relates to a field marker for mounting on an agriculture implement for generating a marked line on the ground indicative of the path of the implement.

Various types of field marker have been provided and one class of field markers known as disk markers include a disk which is carried on the outer end of the arm so the disk runs along the ground at the end of the arm and forms a furrow in the ground which is sufficient for the driver to see and to follow in the next path of the implement parallel to the path in which the furrow is formed.

Various designs of disk marker have been manufactured and proposed and generally the disk marker includes a mounting assembly which attaches to the implement and an arm which is pivotally mounted about an axis along the side of the implement so that the arm can raise and lower as the disk follows the contour of the land. In many cases the disk is moved into a retracted position simply by lifting the disk and the arm about the pivot axis to a raised position. This is suitable for sprayers and other similar implements in which the folding action of the implement for transportation takes place by pivoting a part of the implement about a vertical axis.

However in recent years it has become more popular to provide implements particularly cultivators, air seeders and packers in which the implement folds by way of wing sections which fold up about a horizontal axis parallel to the direction and movement of the implement. In many cases the implement also folds about a second axis so that in the folded position there is a centre portion remaining at ground level, two vertical portions at the sides of the centre portion and then two horizontal portions that project inwardly over the centre portion. For such implements the simple lifting field marker is totally impractical since it interferes with the folding action and hangs down in a totally uncontrolled manner.

SUMMARY OF THE INVENTION

It is one object of the present invention, therefore, to provide a field marker of this general type which includes a folding action which is improved enabling the device to be folded in a more effective manner.

According to the invention, therefore, there is provided a field marker for mounting on an agricultural implement for generating a marked line on the ground indicative of the path of movement of the implement, the marker comprising an arm having an inner end for mounting on the implement and an outer end for projecting outwardly from the implement, a ground marking element mounted on the arm at the outer end thereof for directly engaging the ground and forming a score mark on the ground, mounting means for connection to the implement and arranged to support the inner end of the arm such that the arm during operation is maintained projecting outwardly from one side of the implement in a predetermined orientation relative thereto and allowed to pivot relative to the implement about an axis longitudinal of the side of the implement in a vertical direction, and folding means for pivoting the arm relative to the mounting means to fold to a position in which the arm is held in an orientation extending along the side of the implement substantially parallel to said longitudinal axis.

Preferably the arm includes a first and a second portion which are also foldable about the coupling between the first and second portions through 180° so that in the folded position the second portion lies along side the first portion.

Preferably the mounting means includes a first member which is fixedly attached to the implement and a second member which is pivotally mounted relative to the first. A spring then acts between the first and second members biasing the second member to a raised position. The weight of the arm in the extended position which is carried directly upon the second member is sufficient to overcome the spring force and rest the ground marking element on the ground. However as the arm is retracted or folded, the centre of gravity of the arm moves inwardly to a position in which the spring force is sufficient to overcome the weight of the arm and to raise the arm from the ground by pivotal movement of the second member.

This device therefore retracts the arm of the disk marker into a position in which it lies along the side of the implement so that even when used in the most difficult position on an implement including the double folding action, the marker does not interfere in any way with the folding action and remains properly in place while the implement is folded and as the implement is deployed. The arm is also of sufficient length so that it can provide a mark or furrow at a sufficient distance from the end of the implement so that the mark or furrow can be readily followed by the driver in the next path of the implement.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

FIG. 5 is a cross sectional view along the lines 5—5 of FIG. 3.

DETAILED DESCRIPTION

The agricultural implement on which the marker is mounted is shown verY schematically as including a frame indicated at 10. The frame includes a main longitudinal member which extends along the side of the implement and moves in operation of the implement with its axis along the direction of movement of the implement.

The marker generally includes an arm 11 which has a disk 12 mounted on an outer end of the arm for causing a furrow in the ground as the arm is moved forwardly by the implement. An inner end of the arm is carried by mounting means generally indicated at 13 which connects the arm to the implement so that generally the arm extends at right angles from the implement to a position outwardlY at one side of the implement and is free to pivot up and down in a vertical plane at right angles to the side of the implement so the disk can follow the contours of the ground.

Figure 1:
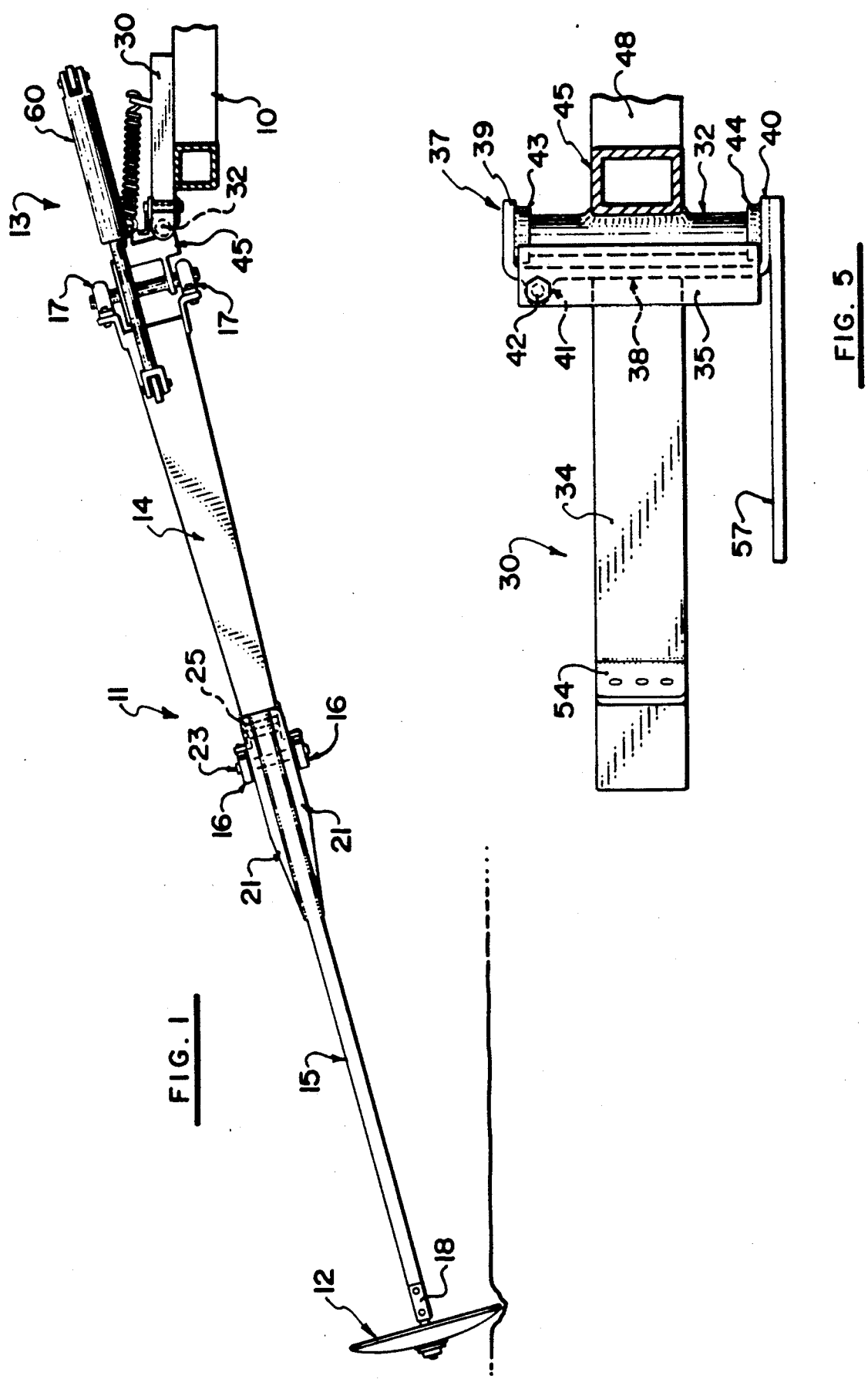
FIG. 1 is a rear elevational view of a field marker according to the invention mounted upon an agriculture implement only one portion of the frame of which is shown with the marker in the operating position.
Figure 2:
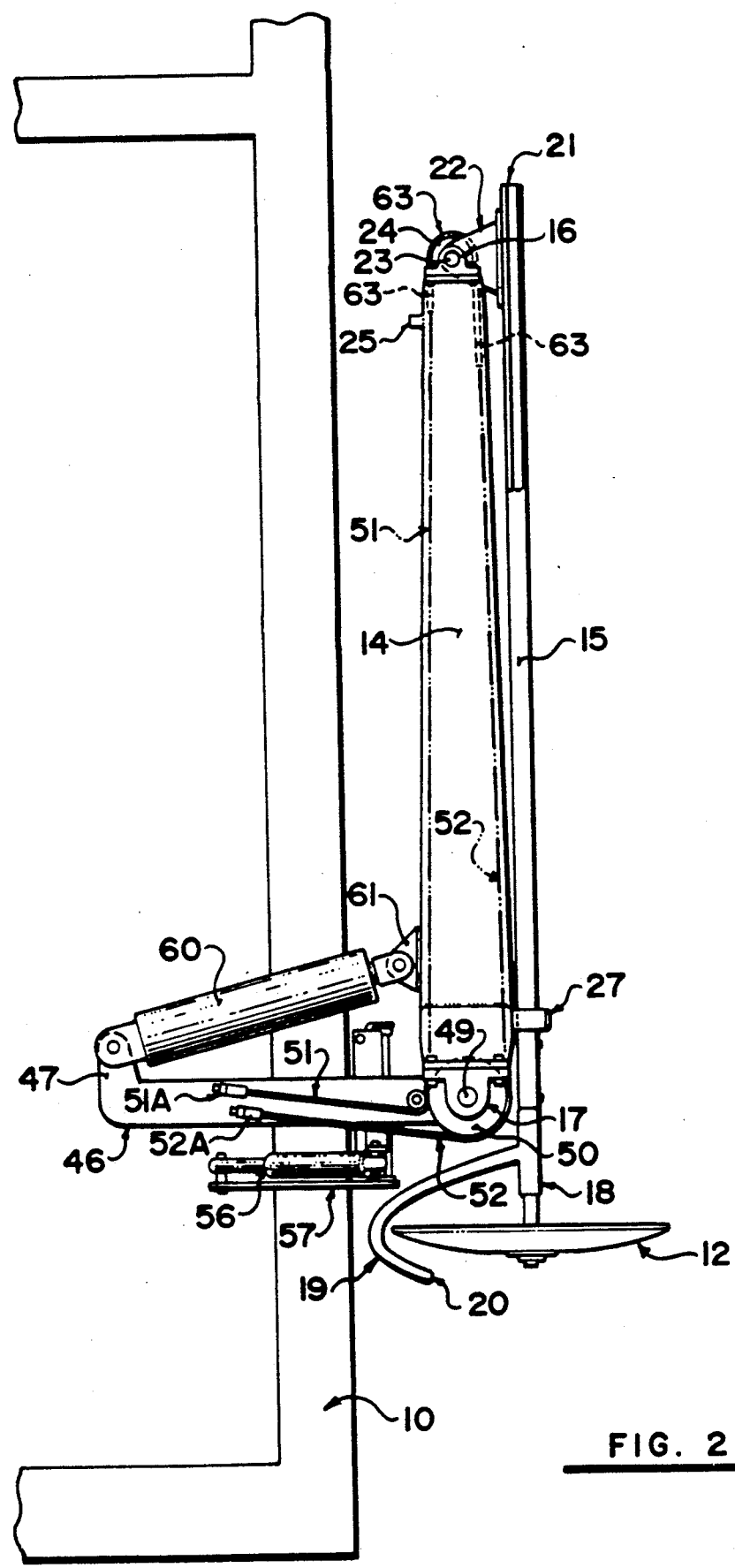
FIG. 2 is a top plan view of the marker of FIG. 1 showing the marker in the folded position.

In general terms it will be appreciated from FIGS. 1 and 2 that the arm includes a first arm portion 14 and a second arm portion 15 which are approximately equal in length. In the extended position shown in FIG. 1 the first arm portion and second arm portion lie in a straight line so the disk is as far as possible from the side of the implement.

In a folded position shown in FIG. 2 the second arm portion 15 lies directly along side the first arm portion 14 that is it is being folded through 180° around bearings 16. At the same time the first arm portion 14 has been folded around bearings 17 through 90° so as to pull the first arm portion to lie directly along the side of the implement 10. In this way, in the folded position both portions of the arm lie along the side of the implement and are held in that position by the mounting means 13 as will be explained hereinafter so that if the side of the implement is raised or even inverted in a folding action of the implement, the portions of the arm and the whole of the marker remain in position along the side of the implement and do not interfere with any other portions of the implement or hang down from the implement.

The disk 12 is of conventional construction and mounted on suitable bearings as is apparent to one skilled in the art. The disk is mounted on an end piece 18 of the arm which carries a clearing element 19 which projects outwardly from the element 18 across the rear of the disk, around one portion of the periphery of the disk to form a hook portion around the periphery of the disk terminating forwardly of the front of the disk as indicated at 20. The clearing element lies in a radial plane of the disk and projects forwardly from the disk to prevent the disk catching onto any obstacles encountered by the disk.

The second arm portion 15 comprises a simple square tube of constant cross section extending from the element 18 toward the bearings 16. A pair of flanges 21 are welded on the sides of the tubular member forming the second arm portion adjacent the bearings 16 to provide increased structural strength. A web 22 is arranged at right angles to the flanges 21 so as to cooperate with a shaft 23 which passes through the bearings 16. The shaft 23 carries a chain wheel 24 which is fixed onto the shaft and rotates with the shaft. The shaft is welded to the webs 22 so that the chain wheel and the second arm portion co-rotate. The shaft 23 is carried in the bearings 16 which are mounted on the outer end of the first arm portion 14. The first arm portion comprises a welded sleeve which is of square cross-section but tapers from a wider end at the mounting means to a narrower end at the bearings 16. The bearings 16 are suitably mounted on the ends of the sleeve so that the weight of the second arm portion can be carried upon the bearings and the outer end of the first arm portion. A comparison of FIGS. 1 and 2 will show the movement of the second arm portion relative to the first arm portion. In FIG. 1 the flanges 21 extend over a short portion of the rear of the first arm portion 14 and engage against a stop 25 to prevent over extension of the knee joint defined between the portions. The second arm portion thus lies along the rear surface of the second arm portion as an extension thereof. In the folded position shown in FIG. 2, the second arm portion 15 rotates around to a position along the front surface of the first arm portion 14 and lies substantially directly along the front of the first arm portion. The length is slightly greater than the first arm portion so that the disk and the clearing element 19 clear the inner end of the first arm portion. A pair of plates 27 project out from the front face of the first arm portion adjacent the mounting means for supporting the outermost end of the second arm portion in the folded position as best shown in FIG. 2.

Figure 3:
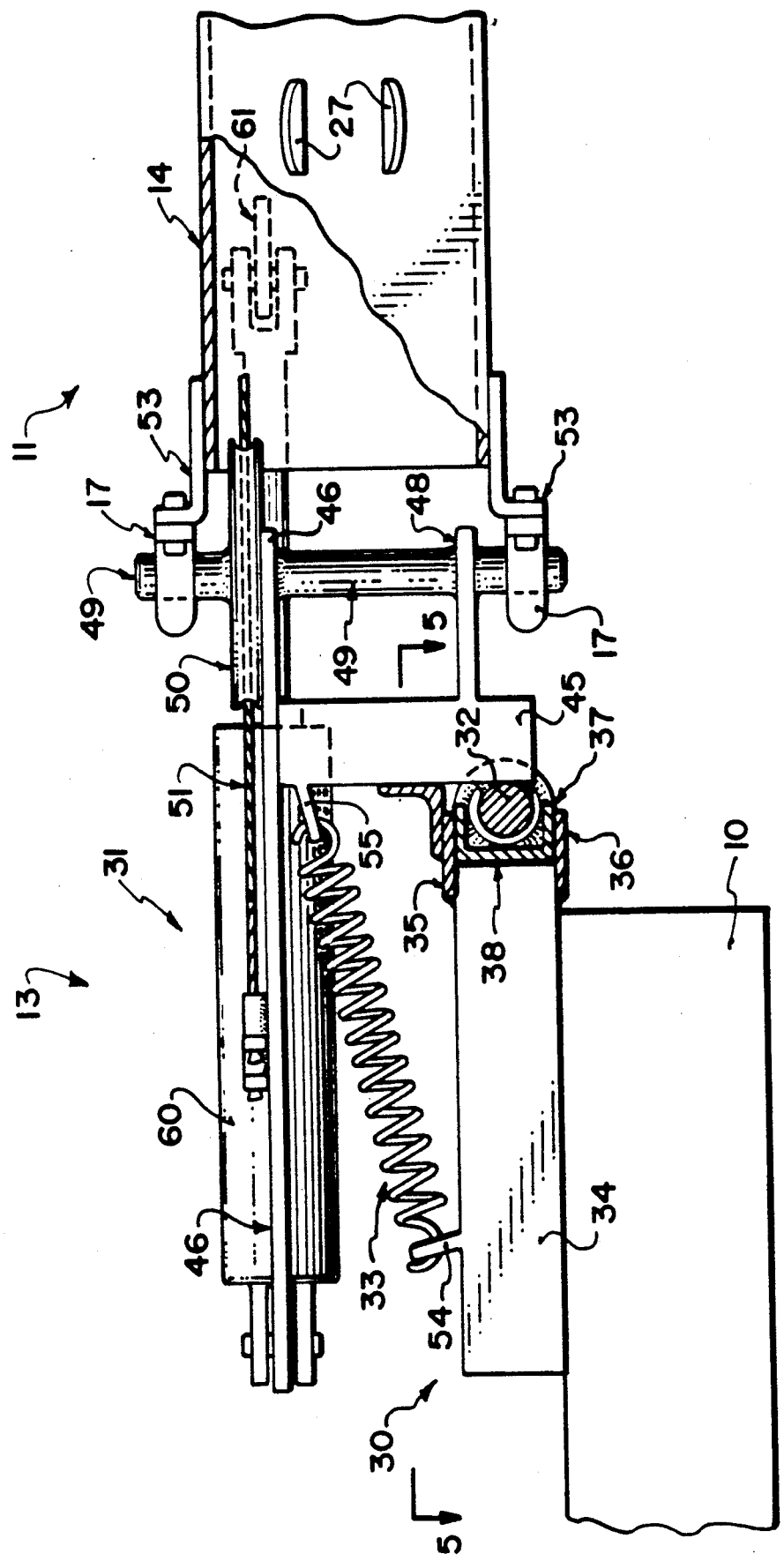
FIG. 3 is a cross sectional view of the marker of FIGS. 1 and 2 with the marker in a position in which it is extended outwardly to the side of the implement, but raised from the ground, the cross-section being and taken along the lines 3—3 shown in FIG. 4.
Figure 4:
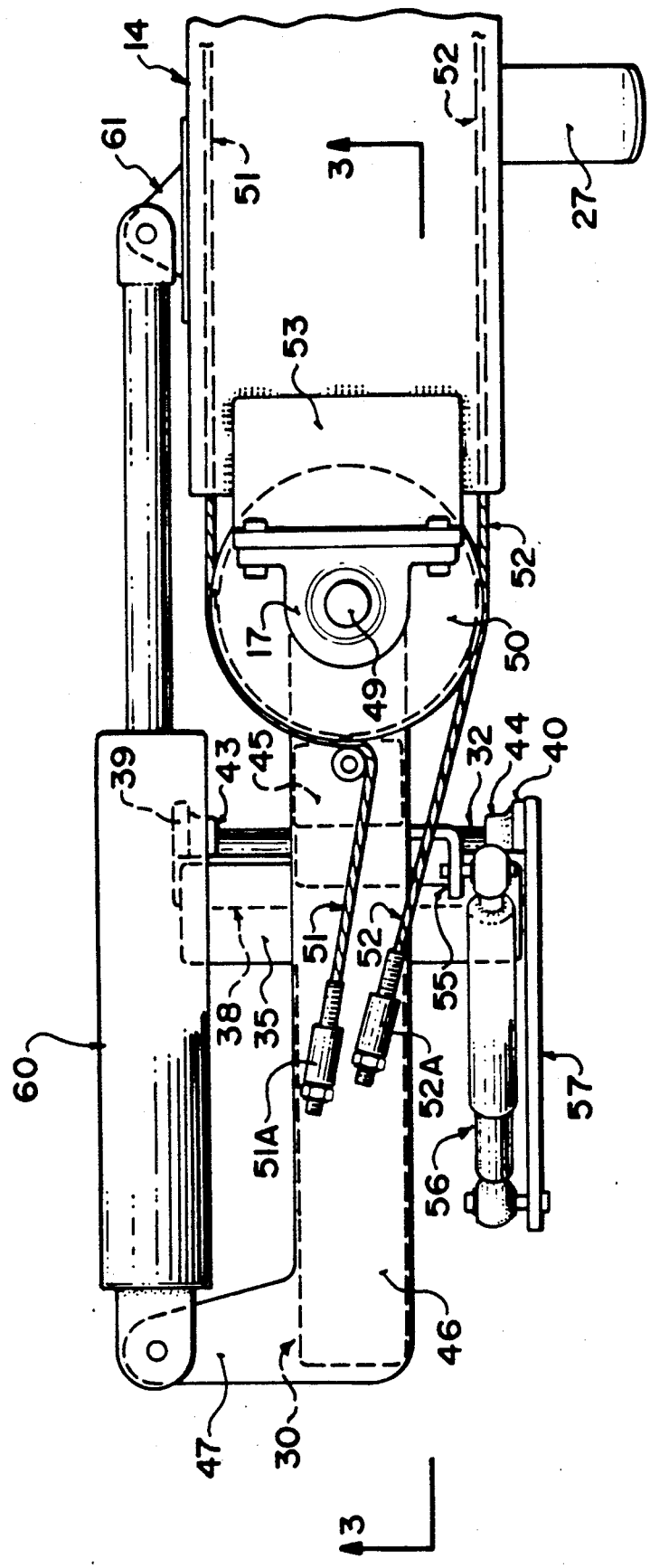
FIG. 4 is a top plan view of the marker of FIGS. 1 and 2 in the position shown in FIG. 3 showing more detail of the construction shown in FIG. 2.

Turning now to the details of the mounting means shown best in FIGS. 3, 4 and 5, the mounting means includes a first member 30 which is fixed onto the frame 10 together with a pivotal member 31 which can pivot relative to the fixed member 30 on a shaft 32 to allow the arm to move upwardly and downwardly in the vertical plane as previously stated. A spring 33 is provided which provides a lifting force tending to raise the arm about the pivot shaft 32 and is connected between the fixed member 30 and the pivotal member 31.

As best shown in FIGS. 3 and 5, the fixed member 30 comprises a beam 34 suitably attached to the frame 10. At an outer end of the beam 34 is welded a pair of flanges 35 and 36 on the top and bottom respectively of the outer end of the beam 34. The flanges project outwardly to the sides of the beam to a short extent.

Between the flanges 35 and 36 is mounted a cradle 37 having a rear web 38 and two sides 39 and 40 which project forwardly from the vertical rear web 38. The rear web 38 carries a pivot sleeve 41 which is connected to the flanges 35 and 36 by a bolt 42 adjacent one corner of the flanges. The cradle 37 is therefore free to pivot about the bolt 42 and this provides a breaking action in the event that the arm impacts on fixed obstacle so that the cradle can break away and pivot around the pin 42 carrying the movable member 31 and the arm in a rearward pivoting action.

The ends 39 and 40 of the cradle carry bushings 43 and 44 respectively which support the shaft 32 for rotation about a horizontal axis parallel to the side of the implement.

A vertical beam 45 is welded onto the front face of the shaft 32 so as to extend generally vertically upwardly therefrom. The beam 45 is however of course pivotal with the shaft and thus moves from the vertical position shown in FIG. 3 to an incline position shown in FIG. 1 as the arm moves downwardly to the operating position when extended. A plate 46 is welded to the top end of the beam 45 and extends rearwardly therefrom parallel to the beam 34. The plate 46 is L-shaped so as to define a leg 47 projecting outwardly to one side. The plate 46 also projects forwardly from the top of the beam 45 and cooperates with a similar forwardly projecting plate portion 48 mounted on the front face of the beam 45 beneath the plate 46 to support a vertical shaft 49 parallel to the beam 45. The shaft 49 is fixed to the plates 48 and 46 and therefore does not rotate. The shaft has also fixed to it a pulley 50 which has a concave surrounding rim to guide a pair of cables 51 and 52. The bearings 17 which provide the rotation of the arm about the shaft 49 are carried on the inner end of the arm portion 14 by a pair of L-shaped brackets 53 welded to the top and bottom surfaces of the arm 14.

The spring 33 is connected between a flange 54 mounted on an upper side of the beam 34 and a flange 55 welded on a rear face of the beam 45. The spring thus acts to bias the pivotal member 31 in an anti-clockwise direction as shown in FIG. 3. In addition the spring provides a return force for the break action provided by the pivotal movement of the cradle 37 since it tends to pull the beam 45 in a clockwise direction around the bolt 42 as best shown in FIG. 5 where the position of the spring extends directly along the beam 34 even though it is not shown. Further suspension action on the movement of the arm is provided by a shock absorber 56 which is connected between one end of the flange 55 as shown in FIG. 4 which projects outwardly to one side of the beam 45 and to a plate 57 which extends rearwardly from the end of the cradle 37. The shock absorber therefore has no effect in relation to the break action of the device but provides a damping effect on the spring action of the arm while it is in the extended position following the ground contour.

The strength of the spring and its mechanical advantage are selected so that in the extended position of the arm shown in FIG. 1 the weight of the arm acting around the pivot shaft 32 is sufficient to overcome the spring force and apply a force downwardly on the disk against the ground. The spring however of course provides a biasing force tending to lift the arm in the clockwise direction shown in FIG. 1.

When the arm is however retracted toward the folded position, the center of gravity of the arm moves inwardly and the spring force is selected so that when the arm reaches a partly retracted position the reduced action of the weight of the arm about the pivot shaft 32 is less than the spring force so that the arm is raised from the ground and the pivotal member of the mounting means takes up the horizontal position shown in FIG. 3. This enables the arm to be retracted more easily so that it is lifted from the ground rather than dragged across the ground and also ensures that the arm when retracted is maintained in a fixed position by the spring force and is not free to move about as the implement is transported.

The actuation of the folding action is provided by a hydraulic cylinder 60 which is coupled at one end to the leg 47 of the plate 46 and at the other end to a lug 61 mounted on the rear face of the arm portion 14. The operation of the cylinder will be appreciated from a comparison of FIGS. 2 and 4.

The folding action of the second arm portion 15 relative to the bearing 16 takes place automatically as the first arm portion rotates about the bearing 17. This is achieved by the cable portions 51 and 52 together with a chain portion 63 which wraps around the chain wheel 24 carried on the shaft 23. The chain portion is attached by a suitable fastener to the ends of the cable portions 51 and 52 as best shown in FIG. 2. The cable portions have ends which are clamped to the plate 46 as indicated at 51A and 52A with the ends being adjustable so as to provide a suitable tension on the cable portions and to locate the chain portion 63 at the required position relative to the ends of the cable portions. The size of the pulley 50 relative to the size of the chain wheel 23 is then chosen so that as the arm portion 14 is rotated through 90° by the cylinder 60, this moves the chain portion 63 along its length sufficiently to rotate the chain wheels 23 to cause the arm portion 15 to rotate through 180°. In this way as the arm portion 14 is drawn in, the arm portion 15 rotates through an angle which is twice the angle of movement of the arm portion 14 until a position shown in FIG. 2 is achieved.

The marker thus described provides an arm which can be of sufficient length to provide a mark at a required position relative to the side of the implement and yet the arm can be fully retracted to a position in which it can be stored and held stationary regardless of movement of the implement during transportation.

The marker shown and described is arranged for use as the left hand side of the implement when facing forwardly. It will be appreciated that a mirror-image marker could be used on the other side of the implement.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A field marker for mounting on an agricultural implement for generating a marked line on the ground parallel to a direction of movement of the implement, the marker comprising an arm having an inner end for mounting on the implement and an outer end for projecting outwardly from the implement, a ground marking element mounted on the arm at the outer end thereof for directly engaging the ground and forming a score mark on the ground, mounting means having first member for connection to the implement and a second member attached to and supporting the inner end of the arm such that the arm, in a working position thereof is maintained projecting outwardly from one side of the implement in a predetermined orientation relative thereto said second member being mounted on said first member for pivotal movement relative thereto about a horizontal axis substantially parallel to the direction of movement such that the arm and ground working element can move vertically to accommodate variations in ground height and folding means for pivoting the arm relative to the mounting means about a generally vertical axis to move to a folded position in which the arm is held in an orientation extending along the side of the implement substantially parallel to said longitudinal axis and spring means biasing said second member relative to said first member toward a raised position of the arm, said spring means being arranged such that, when the arm is in the working position, the weight of the arm is sufficient to overcome the spring force to allow the ground marking element to rest upon the ground and such that, when the arm is in the folded position, the spring force holds the arm in a raised position and holds the arm and the ground marking element against said vertical movement.

2. The invention according to claim 1 wherein the arm includes a first portion and a second portion with the portions being connected for folding movement from an extended position in which the portions lie in a straight line to a folded position in which the second portion pivots through 180° to lie along side the first portion.

3. The invention according to claim 2, including means connected between the inner end of the arm and the coupling between the first and second portions of the arm for causing folding of the second portion relative to the first portion automatically in response to folding of the first portion relative to the mounting means.

4. The invention according to claim 2 wherein the first portion of the arm comprises a tubular body of rectangular cross section converging from a wider end at the inner end of the arm to a narrower end adjacent the coupling between the first and second portions and wherein the second portion comprises an elongate tubular body of cross-section which is narrower than the outer end of the first portion the second portion being slightly longer than the first portion so that the ground marking element in the folded position extends beyond the inner end of the first portion and wherein the first portion includes a support member adjacent the inner end thereof for receiving and supporting the outer end of the second portion in the folded position.

5. An invention according to claim 1 including a hydraulic cylinder mounted on the second member and connected between the second member and the arm so as to actuate movement of said arm in the folding action thereof.

6. A field marker according to claim 1 wherein said second member is mounted on said first member for pivotal movement of said second member and said arm about a substantially vertical axis for movement from a resting position to a breaking position in response to impact of the arm with an obstacle, said spring biassing means acting to pull said second member into said working position.

7. An agricultural implement including a field marker mounted thereon for generating a marked line on the ground parallel to a direction of movement of the implement, the agricultural implement including a frame having a horizontal end beam lying parallel to a direction of motion of the frame; the marker comprising an arm having an inner end for mounting on the implement and an outer end for projecting outwardly from the implement; a ground marking element mounted on the arm at the outer end thereof for directly engaging the ground and forming a score mark on the ground; mounting means mounted on the frame and supporting the inner end of the arm such that the arm, in a working position thereof, is maintained projecting outwardly from said end beam in a predetermined orientation relative thereto; means arranged with said arm in the working position, to allow vertical movement of said ground marking element relative to the end beam to accommodate variation in ground height; and folding means for pivoting the arm relative to the frame about a substantially vertical fold axis to a folded position in which the arm is held in an orientation extending along side the end beam of the implement substantially parallel to said direction of movement; said mounting means and said folding means, in said folded position, holding said arm and said ground marking element against said vertical movement.

8. The invention according to claim 7 wherein the arm includes a first portion and a second portion with the portions being connected for folding movement about an axis parallel to said fold axis from an extended position in which the portions lie in a straight line to a folded position in which the second portion pivots through 180° to lie along side the first portion.

9. The invention according to claim 7 wherein the mounting means comprises a first member fixedly mounted on the frame and a second member which is pivotally mounted on the first member for pivotal movement relative thereto about an axis parallel to the direction of motion to provide said vertical movement, said arm being mounted upon said second member so as to pivot therewith about the first member and wherein there is provided spring means biassing said second member to apply a lifting force to said arm.

10. The invention according to claim 9 wherein the spring means is arranged such that when the arm is in the operating position the weight of the arm is sufficient to overcome the spring force to allow said ground marking element to rest upon the ground and such that as the arm is folded and the center of gravity of the arm moves toward the implement the spring force overcomes the weight of the arm to pivot the second member and the arm into a raised position thereof.

11. The invention according to claim 9 including a hydraulic cylinder mounted on the second member and connected between the second member and the arm so as to actuate movement of said arm in the folding action thereof.

12. The invention according to claim 7 wherein the first portion of the arm comprises a tubular body of rectangular cross-section converging from a wider end at the inner end of the arm to a narrower end adjacent the coupling between the first and second portions and wherein the second portion comprises an elongate tubular body of cross-section which is narrower than the outer end of the first portion, the second portion being slightly longer than the first portion so that the ground marking element in the folded position extends beyond the inner end of the first portion and wherein the first portion includes a support member adjacent the inner end thereof for receiving and supporting the outer end of the second portion in the folded position.

13. A field marker for mounting on an agricultural implement for generating a marked line on the ground parallel to a direction of movement of the implement, the marker comprising an arm having an inner end for mounting on the implement and an outer end for projecting outwardly from the implement, a ground marking element mounted on the arm at the outer end thereof for directly engaging the ground and forming a score mark on the ground, mounting means for connection to the implement and arranged to support the inner end of the arm such that the arm in a working position thereof is maintained projecting outwardly from one side of the implement in a predetermined orientation relative thereto means arranged, with said arm in the working position to allow vertical movement of said ground marking element relative to the mounting means to accommodate variation in ground height and folding means for pivoting the arm relative to the mounting means about a substantially vertical fold axis to fold to a folded position in which the arm is held in an orientation extending along the side of the implement substantially parallel to said direction of movement, said arm including a first portion and a second portion with the portions being connected for folding movement about an axis parallel to said fold axis from an extended position in which the portions lie in a straight line to a folded position in which the second portion pivots through 180° to lie along side the first portion.

14. The invention according to claim 13 wherein the mounting means comprises a first member for fixed mounting on the implement and a second member which is pivotally mounted on the first member for pivotal movement relative thereto about said longitudinal axis, said arm being mounted upon said second member so as to pivot therewith about the first member and wherein there is provided spring heads biassing said second member to apply a lifting force to said arm.

15. The invention according to claim 14 wherein the spring means is arranged such that when the arm is in the operating position the weight of the arm is sufficient to overcome the spring force to allow said ground marking element to rest upon the ground and such that as the arm is folded and the center of gravity of the arm moves toward the implement the spring force overcomes the weight of the arm to pivot the second member and the arm into a raised position thereof.

16. The invention according to claim 14 including a hydraulic cylinder mounted on the second member and connected between the second member and the arm so as to actuate movement of said arm in the folding action thereof.

17. The invention according to claim 13 including means connected between the inner end of the arm and the coupling between the first and second portions of the arm for causing folding of the second portion relative to the first portion automatically in response to folding of the first portion relative to the mounting means.

18. The invention according to claim 13 wherein the first portion of the arm comprises a tubular body of rectangular cross-section converging from a wider end at the inner end of the arm to a narrower end adjacent the coupling between the first and second portions and wherein the second portion comprises an elongate tubular body of cross-section which is narrower than the outer end of the first portion, the second portion being slightly longer than the first portion so that the ground marking element in the folded position extends beyond the inner end of the first portion and wherein the first portion includes a support member adjacent the inner end thereof for receiving and supporting the outer end of the second portion in the folded position.

19. A field marker according to claim 13 wherein said second member is mounted on said first member for pivotal movement of said second member and said arm about a substantially vertical axis for movement from a resting position to a breaking position in response to impact of the arm with an obstacle, said spring biassing means acting to pull said second member into said working position.

* * * * *